(12) United States Patent
Akira et al.

(10) Patent No.: US 11,367,219 B2
(45) Date of Patent: Jun. 21, 2022

(54) VIDEO ANALYSIS APPARATUS, PERSON RETRIEVAL SYSTEM, AND PERSON RETRIEVAL METHOD

(71) Applicant: HITACHI, LTD., Tokyo (JP)

(72) Inventors: Naoto Akira, Tokyo (JP); Atsushi Hiroike, Tokyo (JP); Tsutomu Imada, Tokyo (JP); Hiromu Nakamae, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 17/253,842

(22) PCT Filed: Jun. 11, 2019

(86) PCT No.: PCT/JP2019/023083
§ 371 (c)(1),
(2) Date: Dec. 18, 2020

(87) PCT Pub. No.: WO2020/017190
PCT Pub. Date: Jan. 23, 2020

(65) Prior Publication Data
US 2021/0264636 A1    Aug. 26, 2021

(30) Foreign Application Priority Data
Jul. 18, 2018  (JP) .............................. JP2018-134607

(51) Int. Cl.
*H04N 7/18*     (2006.01)
*G06T 7/73*     (2017.01)
(Continued)

(52) U.S. Cl.
CPC .............. *G06T 7/74* (2017.01); *G06V 40/103* (2022.01); *G06V 40/168* (2022.01); *H04N 5/247* (2013.01);
(Continued)

(58) Field of Classification Search
CPC .......... G06T 7/74; G06T 7/246; G06T 7/292; G06T 2207/30196; G06T 2207/30241;
(Continued)

(56) References Cited

U.S. PATENT DOCUMENTS

2011/0019003 A1    1/2011  Asa et al.
2013/0030875 A1    1/2013  Lee et al.
(Continued)

FOREIGN PATENT DOCUMENTS

CN      207689691 U  *  8/2018
EP      1844443 B1  * 12/2012   ......... G06K 9/00369
(Continued)

OTHER PUBLICATIONS

International Search Report, PCT/JP2019/023083, dated Sep. 17, 2019, 4 pgs.
(Continued)

*Primary Examiner* — Peet Dhillon
(74) *Attorney, Agent, or Firm* — Volpe Koenig

(57) ABSTRACT

A video analysis apparatus is connected to an image capturing apparatus including a plurality of cameras, in which the video analysis apparatus, for a plurality of persons in images captured by the cameras, tracks at least one of the plurality of persons, detects a plurality of parts of the tracked person, and on the basis of information defining scores used to determine a best shot of each of the parts, computes a score for the part for each of frames of videos from security cameras, compares, for each of the parts, the scores for each part computed for each of the frames to determine a best shot of each of the parts, stores, for each of the parts, a feature value in association with the part, and compares the feature values of each of the parts of the plurality of persons to determine identity of the persons.

13 Claims, 11 Drawing Sheets

(51) Int. Cl.
*H04N 5/247* (2006.01)
*G06V 40/10* (2022.01)
*G06V 40/16* (2022.01)

(52) U.S. Cl.
CPC ............... *G06T 2207/30196* (2013.01); *G06T 2207/30241* (2013.01)

(58) Field of Classification Search
CPC ........... G06K 9/00268; G06K 9/00288; G06K 9/00369; G06K 9/00771; H04N 5/247; H04N 7/181
See application file for complete search history.

(56) References Cited

U.S. PATENT DOCUMENTS

| | | | | |
|---|---|---|---|---|
| 2013/0266181 A1* | 10/2013 | Brewer | ............. | G06K 9/00302 382/103 |
| 2015/0098686 A1* | 4/2015 | Obukhov | ................ | H04N 5/77 386/226 |
| 2015/0154472 A1 | 6/2015 | Yano et al. | | |
| 2016/0239712 A1 | 8/2016 | Kitano | | |
| 2017/0053409 A1* | 2/2017 | Yamamoto | ......... | G06K 9/00362 |
| 2017/0083768 A1* | 3/2017 | Xu | ..................... | G06Q 10/0832 |
| 2017/0337426 A1 | 11/2017 | Werner et al. | | |
| 2018/0018508 A1* | 1/2018 | Tusch | ................ | G06K 9/00771 |
| 2018/0096209 A1 | 4/2018 | Matsuda et al. | | |

FOREIGN PATENT DOCUMENTS

| | | |
|---|---|---|
| JP | 2007-006324 A | 1/2007 |
| JP | 2011-29737 A | 2/2011 |
| JP | 2015-106300 A | 6/2015 |
| JP | 2017-41022 A | 2/2017 |
| WO | 2015/045233 A1 | 4/2015 |

OTHER PUBLICATIONS

Extended European Search Report dated Feb. 15, 2022 for European Patent Application No. 19837429.0.

* cited by examiner

FIG. 3

| # | ITEM | CONDITION | ITEM SCORE |
|---|---|---|---|
| 1 | REGION S (pixel) | S<80 | 1 |
|   | REGION S (pixel) | 80≦S<120 | 2 |
|   | REGION S (pixel) | 120≦S<160 | 3 |
|   | REGION S (pixel) | S≧160 | 4 |
| 2 | PARTS FRONTAL DEGREE D (DEGREES) | -15≦D≦15 | 4 |
|   | PARTS FRONTAL DEGREE D (DEGREES) | -30≦D<-15, 15<D≦30 | 3 |
|   | PARTS FRONTAL DEGREE D (DEGREES) | -45≦D<-30, 30<D≦45 | 2 |
|   | PARTS FRONTAL DEGREE D (DEGREES) | -60≦D<-45, 45<D≦60 | 1 |
|   | PARTS FRONTAL DEGREE D (DEGREES) | D<-60, D>60 | 0 |
| 3 | NUMBER OF GEOMETRICAL FEATURE POINTS N (PIECES) | N>30 | 3 |
|   | NUMBER OF GEOMETRICAL FEATURE POINTS N (PIECES) | N>60 | 6 |
| 4 | LUMINANCE VALUE Y (0-255) | 0≦S<80 | 0 |
|   | LUMINANCE VALUE Y (0-255) | 80≦S<170 | 1 |
|   | LUMINANCE VALUE Y (0-255) | 170≦S≦255 | 2 |
| 5 | DETECTION RELIABILITY C (0-1) | C<0.4 | 0 |
|   | DETECTION RELIABILITY C (0-1) | 0.4≦C<0.6 | 1 |
|   | DETECTION RELIABILITY C (0-1) | 0.6≦C<0.8 | 2 |
|   | DETECTION RELIABILITY C (0-1) | 0.8≦C≦1.0 | 3 |

FIG.4

| PERSON TRAJECTORY ID | MERGE TABLE ID | HEAD | FACE | PROFILE | CLOTHS (UPPER FRONT) | BAG | SHOES | HAT | UPDATE TIME |
|---|---|---|---|---|---|---|---|---|---|
| 10001 | 200001 | 10360 | 10318 | 10358 | 10364 | 10311 | 10355 | - | 13:00:12 |
| 10002 | 200002 | 10034 | 10031 | 10036 | 10037 | - | 10304 | - | 13:00:15 |
| 10003 | 200001 | 10··· | 10··· | 10··· | 10··· | 10··· | 10··· | - | 13:05:00 |
| 10004 | 100··· | 10··· | 10··· | 10··· | 10··· | - | 10··· | - | 13:03:42 |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |

FIG.5

| PERSON ID | HEAD | FACE | PROFILE | CLOTHS (UPPER FRONT) | BAG | SHOES | HAT | WATCH | UPDATE TIME |
|---|---|---|---|---|---|---|---|---|---|
| 200001 | 10360 | 10318 | 10358 | 10364 | 10031 | 10311 | - | - | 13:00:12 |
| 200002 | 10034 | 10031 | 10036 | 18321 | - | 15807 | - | 14316 | 16:50:15 |
| 200003 | 10362 | 17957 | 14612 | 16741 | 11144 | 18321 | - | - | 17:03:20 |
| 200004 | 10760 | 10282 | 16147 | 10327 | 10696 | 19891 | - | 14560 | 16:12:22 |
| ... | ... | 1280475 | ... | ... | ... | ... | ... | ... | ... |
| ... | ... | ... | ... | ... | ... | ... | ... | ... | ... |
| ... | ... | ... | ... | ... | ... | ... | ... | ... | ... |

| # | PARTS ID | PARTS TYPE | FEATURE VALUE | PARTS COORDINATES | FRAME ID | SCORE |
|---|---|---|---|---|---|---|
| 1 | 10318 | FACE | 100001.dat | 100,100,130,140 | 1000000123 | 5 |
| 2 | 10358 | PROFILE | 100010.dat | 230,130,260,155 | 1000000123 | 5 |
| 3 | 10364 | CLOTHS (UPPER FRONT) | 100013.dat | 285,140,352,191 | 1000000123 | 4 |
| 4 | 10031 | BAG | 100019.dat | 123,214,145,253 | 1000000125 | 5 |
| ... | ... | ... | ... | ... | ... | ... |
| 10 | 10003 | FACE | 100030.dat | 563,172,492,212 | 1000000141 | 3 |
| ... | ... | ... | ... | ... | ... | ... |

VIDEO ANALYSIS APPARATUS, PERSON RETRIEVAL SYSTEM, AND PERSON RETRIEVAL METHOD

TECHNICAL FIELD

The present invention relates to a technique for retrieving or tracking a particular person in a video.

BACKGROUND ART

With spreading installation sites of security cameras, there has been a growing need to search for a particular person in a security camera video. An example of the purpose of retrieval of a person is to check, in a case where a person of interest is discovered, past actions of the person or track and monitor the subsequent action of the person. Patent Document 1 describes an example of a technique in which, even in a case where the front face of a person cannot always be detected, the person is accurately tracked to detect a character.

Patent Document 1 discloses a method of detecting the amount of change in face size of a face image continuously detected in a video and in a case where the amount of change is continuous, determining the amount of change to indicate the identical person, saving a face image suitable for saving, in a storage medium as a best shot, and using the saved information as a search key to retrieve a person.

PRIOR ART DOCUMENT

Patent Document

Patent Document 1: JP-2007-006324-A

SUMMARY OF THE INVENTION

Problems to be Solved by the Invention

The technique in Patent Document 1 focuses only on the face as the best shot, and thus, in a case where no best shot is present that enables the person to be identified only on the basis of the face, person retrieval may be difficult. Additionally, in a case where an attempt is made to track a person utilizing a plurality of cameras, other cameras may fail to capture images of the face, precluding tracking using the other cameras. In addition, not only a person but also the danger of baggage leads to the need to retrieve the person as in baggage inspection in airports, the technique in Patent Document 1 fails to perform tracking with the baggage also focused on.

Thus, an object of the present invention is to provide a technique for acquiring a large amount of information definitely representing the features of a person to allow the identical person to be retrieved.

Additionally, an object of the present invention is to provide a technique for allowing accurate execution of association of particular persons in videos from a plurality of cameras and retrieval, from the videos, of a person designated as a person on a blacklist.

Means for Solving the Problems

To solve the above-described problems, as an example of a video analysis apparatus according to the present invention, the video analysis apparatus is connected to an image capturing apparatus including a plurality of cameras, and for a plurality of persons in images captured by the cameras, tracks at least one of the plurality of persons, detects a plurality of parts of the tracked person, for the plurality of parts detected, on the basis of information defining scores used to determine a best shot of each of the parts, computes a score for each part for each of frames of videos from security cameras, compares, for each of the parts, the scores for each part computed for each of the frames to determine a best shot of each of the parts, stores, for each of the parts, a feature value in association with each part, and compares the feature values of each of the parts of the plurality of persons to determine identity of the persons.

Additionally, to solve the above-described problems, as an example of a person retrieval system according to the present invention, the person retrieval system is a person retrieval system including a video analysis apparatus connected to an image capturing apparatus with a plurality of cameras, and a workstation including a display section, and an input section, and the video analysis apparatus, for a plurality of persons in images captured by the cameras, tracks at least one of the plurality of persons, detects a plurality of parts of the tracked person, for the plurality of parts detected, on the basis of information defining scores used to determine a best shot of each of the parts, computes a score for the part for each of frames of videos from security cameras, compares, for each of the parts, the scores for each part computed for each of the frames to determine a best shot of each of the parts, stores, for each of the parts, a feature value in association with each part, and compares the feature values of each of the parts of the plurality of persons to determine identity of the persons.

Advantage of the Invention

According to the present invention, the best shots representing the features of the plurality of parts of the person can be selected from a plurality of frame images, and the feature values of the best shots can be determined. Thus, the identical person can be retrieved and tracked with high accuracy.

BRIEF DESCRIPTION OF THE DRAWINGS

FIG. 3 is a diagram illustrating an example of a best shot definition table.

FIG. 4 is a diagram illustrating an example of a best shot camera table.

FIG. 5 is a diagram illustrating an example of a best shot merge table.

MODE FOR CARRYING OUT THE INVENTION

Example 1

<General Configuration>

First, a first embodiment of the present invention will be described with reference to the drawings.

Figure 1:
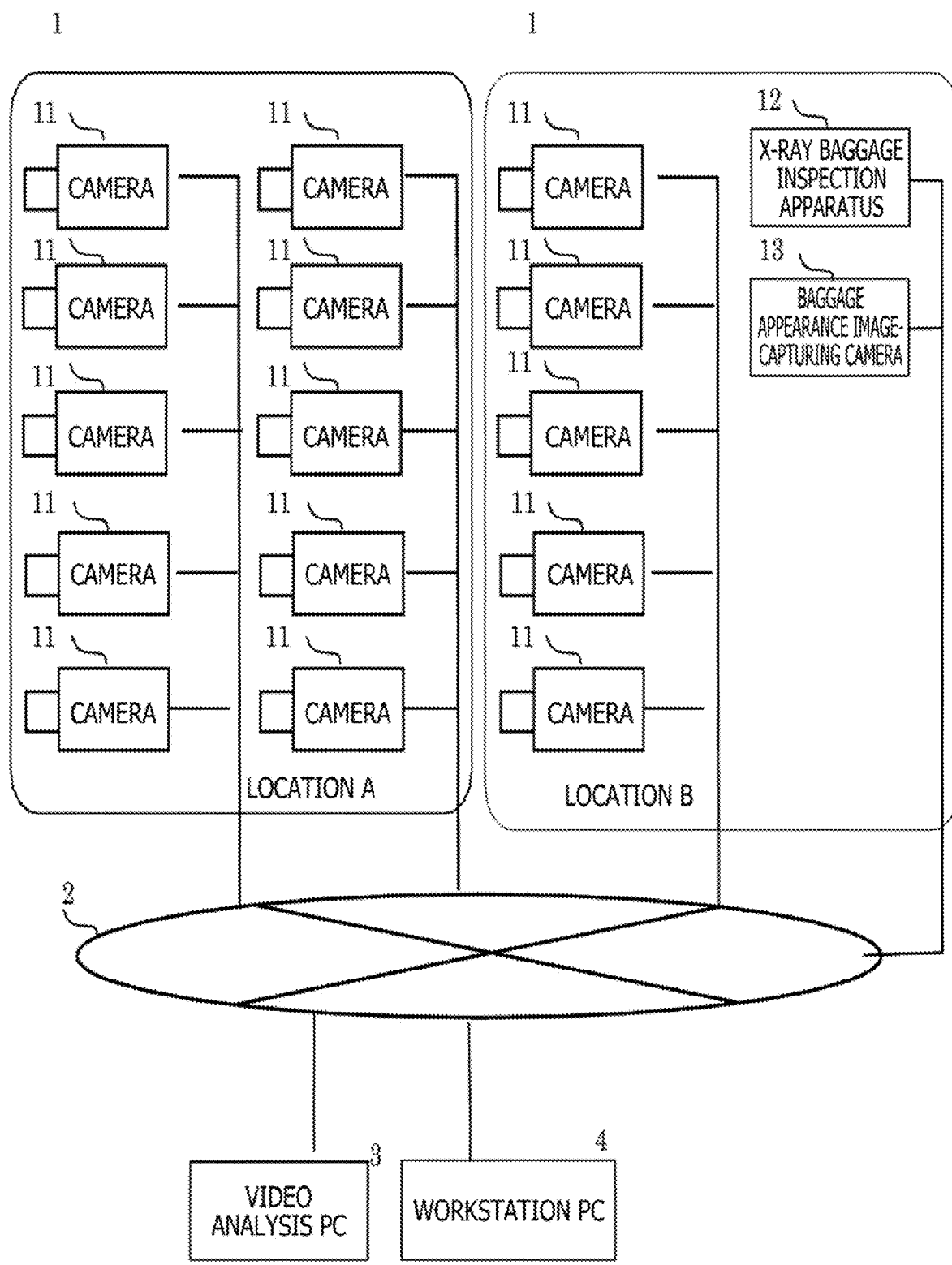
FIG. 1 is a configuration diagram illustrating an example of a person retrieval system.

FIG. 1 is a configuration diagram illustrating an example of a person retrieval system. In FIG. 1, the person retrieval system includes input devices 1 including an image capturing device and a baggage retrieval apparatus, a network 2 such as the Internet or an intranet which connects the input devices 1 to PCs (personal computers), a video analysis apparatus (hereinafter referred to as a video analysis PC) 3 analyzing the contents of input or accumulated videos, and a workstation PC 4 used for, for example, giving an instruction for person retrieval, displaying results of the person retrieval, and raising an alert. The input devices 1 include a plurality of image capturing apparatuses (cameras) 11 such as security cameras which are installed to monitor the entireties of the respective locations, an X-ray baggage inspection apparatus (referred to as an X-ray inspection apparatus) 12 inspecting whether a bag or a personal item contains a hazardous material, and a baggage appearance image-capturing camera (referred to as a baggage appearance camera) 13 capturing an image of the appearance of baggage at positions where the baggage is conveyed, such as the inside of the X-ray inspection apparatus 12 or the vicinity of the apparatus. Additionally, these devices can be installed at a plurality of locations to share and utilize videos and the like among the plurality of locations. In addition, for these input devices 1, not all the types of devices need to be installed at all the locations, and it is sufficient that required types of devices are installed.

The baggage appearance camera 13 is installed inside or around the X-ray inspection apparatus 12, and in a case where an X-ray image captured by the X-ray inspection apparatus 12 contains a hazardous material or a piece of inspection-needed baggage, an image of appearance of the piece of baggage is captured when the piece of baggage is automatically or manually designated. Additionally, the baggage appearance camera 13 can be installed in a place where no X-ray inspection apparatus is provided, such as at a turntable from which baggage checked at the airport is collected. Note that any other means may be used for image capturing as long as an image of the appearance of the baggage can be captured.

Figure 2:
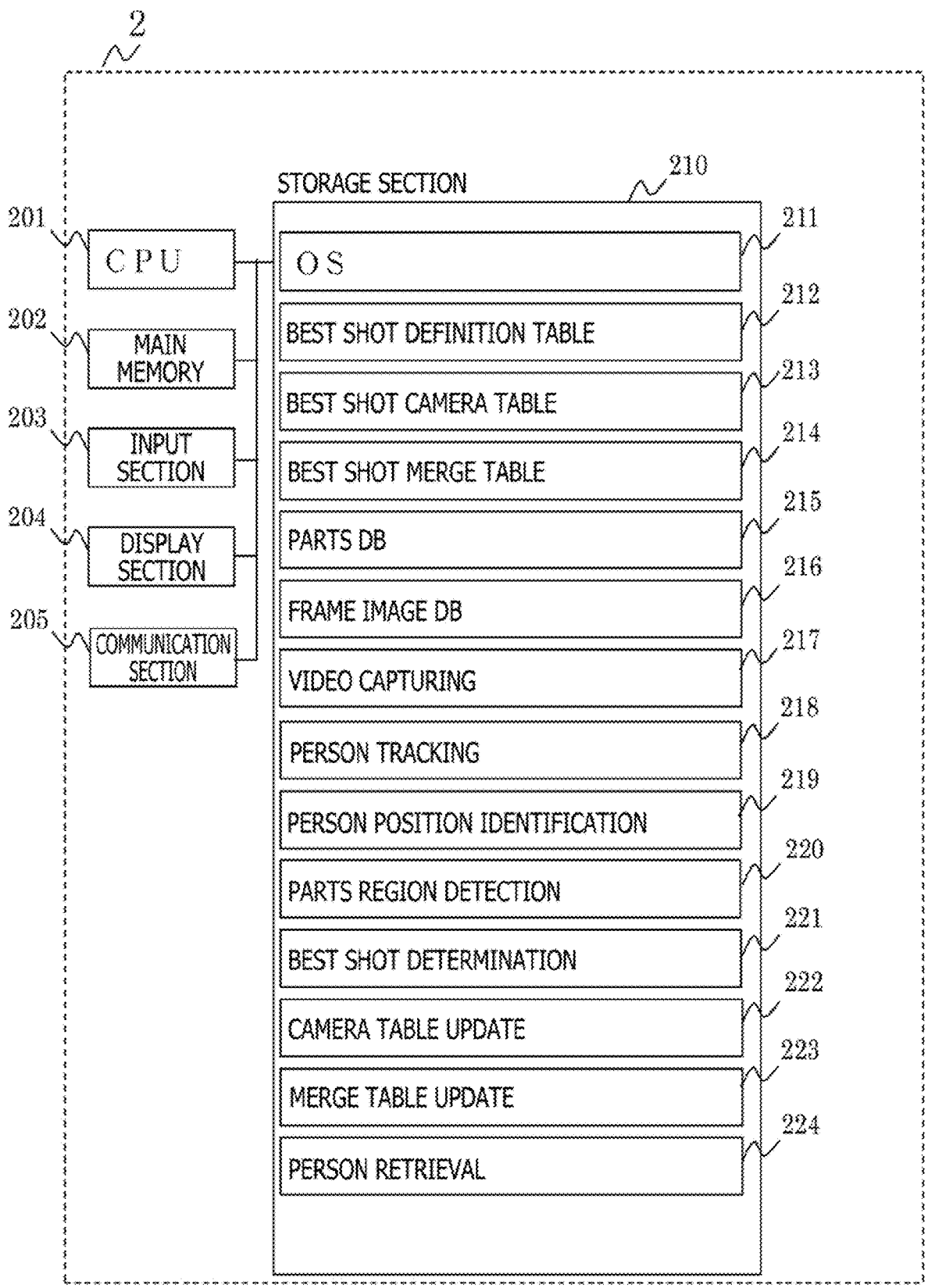
FIG. 2 is a diagram illustrating an example of a configuration of a video analysis apparatus.

Now, the video analysis PC 3 will be described with reference to FIG. 2. FIG. 2 is a diagram illustrating an example of a configuration of the video analysis PC.

The video analysis PC 3, which analyzes videos captured by the cameras 11 and acquires and stores best shots of persons for each of the cameras 11, includes a computer including a CPU 201, a main memory 202, an input section 203, a display section 204, a communication section 205, and a storage section 210. The storage section 210 stores an OS 211, a best shot definition table 212, a best shot camera table 213, a best shot merge table 214, a parts DB 215, a frame image DB 216, a video acquisition program 217, a person tracking program 218, a person position identification program 219, a parts region detection program 220, a best shot determination program 221, a camera table update program 222, a merge table update program 223, and a person retrieval program 224.

The various programs (217 to 224) stored in the storage section 210 are loaded into the main memory 202 and executed by the CPU 201 to implement various functions.

FIG. 3 illustrates an example of the best shot definition table 212. The best shot definition table 212 contains registered information defining scores used to determine the best shot of each of the parts of a person such as a head, a face, a profile, a set of clothes, and a bag. Item scores in the best shot definition table define scores for the respective items (31 to 35) such as an area S31, a frontal degree D32, and the number of geometric feature points N which are used for each type of the parts.

For example, in regard to the parts of the face, the score for the face is computed by using the area 31 of the face, the frontal degree 32 of the parts indicating the frontal degree of the face, and a detection reliability 35 indicating the reliability of detection of a face, and adding the values of the scores (item scores) for the items used. Such a score for the face is compared with a score for the face of the identical person in another image of a different time and is used as information for selecting the face with the higher score as the best shot. Note that, for artificial items such as a set of clothes and a bag which are worn or brought by persons, a geometric feature 33 representing an individual feature such as a pattern, a luminance value 34 indicating clarity, and the like are major influence factors for determining the best shot of each part, and thus, these items may be included.

For example, in a case where the best shot of the head is determined, the score for the head is computed by calculating a score for each of three items including the area 31 of the region identified as the head region, the parts frontal degree 32 indicating the angle of the head, and the detection reliability 35, and adding these scores together. The area refers to the area of the head region detected, that is, the number of pixels detected, and the angle of the head refers to the angle of the head as viewed from the camera, the angle being obtained from a traveling direction of the person or the result of face detection.

In a case where the best shot of the profile is determined, the score for the profile is computed by defining scores for the area 31 of the region identified as the profile, the parts frontal degree 32 indicating the direction of the face, and the detection reliability 35. Determination of whether the profile has been detected may be acquired from the traveling direction of the person, or the direction may be estimated by a general technique such as deep learning using the feature of appearance of the entire body.

For the best shot of the set of clothes, the score for the clothes is computed by defining, for example, for the forward direction of the upper body, the backward direction of the upper body, the forward direction of the lower body, and the backward direction of the lower body, scores for the area 31 of the set of clothes, the parts frontal degree 32 indicating the frontal degree, the geometric feature point 33 indicating the feature of design of the set of clothes, the luminance value 34, and the detection reliability 35. The frontal angle is acquired from the traveling direction of the person. Here, the number of geometric feature points 33 can be determined by using known SIFT feature values or the like to extract feature points. Alternatively, edge components may be extracted by Hough transform, and scores may be defined on the basis of the sum of lengths of edges or the like.

The best shot of a hat is obtained by calculating the score as is the case with the set of clothes. Note that a person with no hat does not have the corresponding part and is thus excluded from computation targets.

The best shot of a watch relates to a small part and involves no standard direction, and thus, the score is computed using the area or the detection reliability. Note that a person with no watch does not have the corresponding part and is thus excluded from the computation targets.

As described above, the score for each part can be computed by using the area 31, the parts frontal degree 32, the number of geometric feature points 33, the luminance value 34, the detection reliability 35, and the like to select items representing the feature of each part of the person and adding the scores together. Note that, not only the simple addition of the scores for the items, but also an average value may be set by dividing the sum of the scores for the items by the number of the items. Alternatively, the score for each part may be computed by weighting the score for each item depending on the part. The items in the best shot definition table are not limited to those illustrated in FIG. 3, and items can be added to the best shot definition table depending on the feature of each part.

The examples of the best shot definition table are illustrative, and another score definition method may be used as long as parts with a large amount of information can be selected as target parts. Note that the best shots can also be registered in the best shot definition table by registering images of parts captured under conditions for obtaining the best shots, as images for the respective types of parts, and using a known similar-image retrieval technique to acquire images among which similar images are determined as best shots.

FIG. 4 illustrates an example of the best shot camera table 213.

Figures 6, 7:
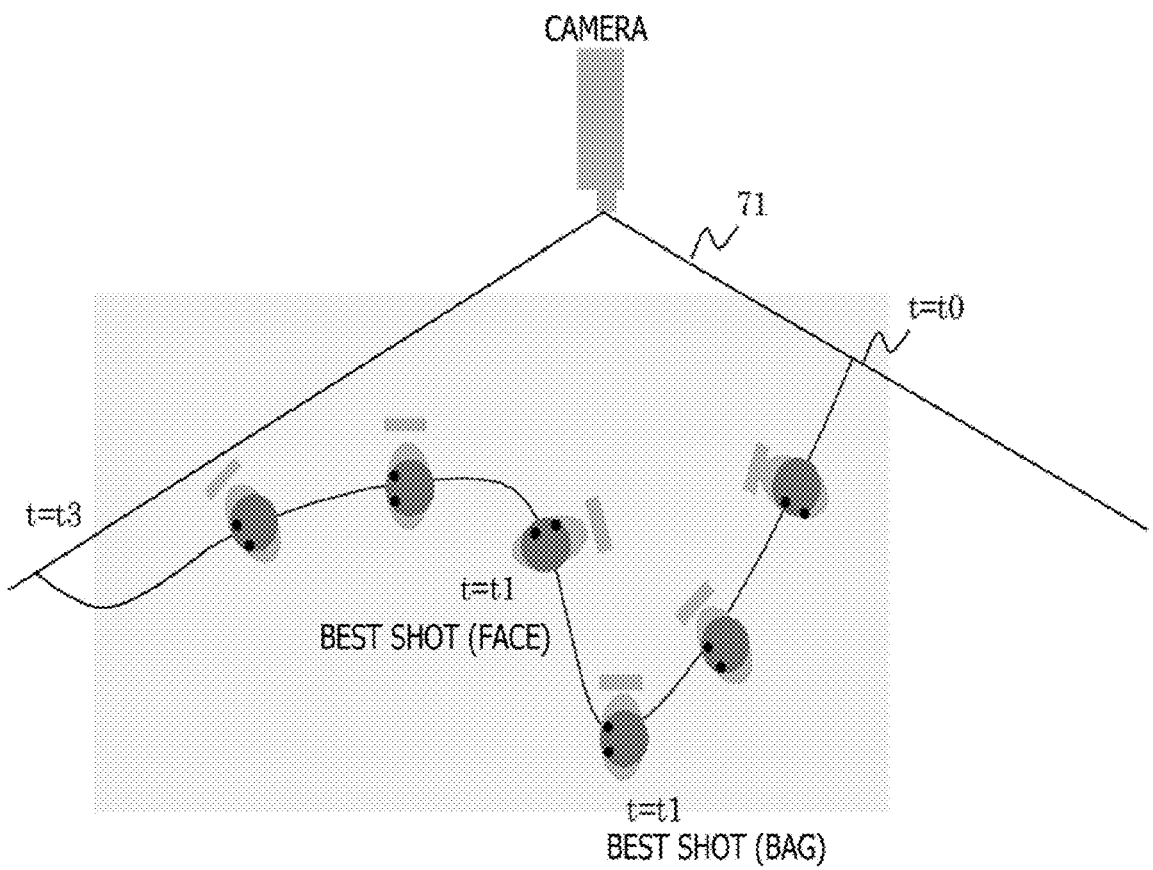
FIG. 6 is a diagram illustrating an example of a parts DB.
FIG. 7 is a diagram illustrating an example of best shot acquisition.

The following are registered in the best shot camera table 213: a person trajectory ID 41 identifying a person determined to be identical within the same camera, a merge table ID 42 used to reference a person trajectory registered in the best shot merge table 214 illustrated in FIG. 5, parts for the best shots such as a head 43, a face 44, a profile 45, a set of clothes (upper front) 46, a bag 47, a pair of shoes 48, and a hat 49, and information 410 regarding the date and time of the last update of the best shots. For each part, the value of the parts ID illustrated in FIG. 6 is stored. The parts ID is information managed in association with the feature value and the score for the part and will be described below using FIG. 6. Note that the parts illustrated in FIG. 4 are illustrative and that, for example, besides the set of clothes (upper front) 46 indicating the front of a jacket, a set of clothes (upper back) indicating the back of the jacket, a set of clothes (lower front) in the front of clothes for the lower body, a set of clothes (lower back) in the back of the set of clothes for the lower body, or the like may be added.

The first two digits of the person trajectory ID correspond to a value used to identify the camera, and a camera ID and a camera identification ID may be managed in a table as different values. Note that, with a plurality of cameras available, the best shot camera table 213 is created for each of the person trajectories from the respective cameras. However, the best shot camera table 213 may be prepared on a camera-by-camera basis or the best shot camera tables 213 may be integrated into a single table.

FIG. 5 is a diagram illustrating an example of the best shot merge table 214. As illustrated in FIG. 5 as an example, a person ID (which can be associated with the merge table ID 42 in FIG. 4) 51 identifying a person determined to be identical within a plurality of cameras is registered, and a head 52, a face 53, a profile 54, a set of clothes 55, a bag 56, a pair of shoes 57, a hat 58, a watch 59, and information regarding the date and time 510 of the last update of the best shots are registered as is the case with FIG. 4. In the best shot merge table 214, the values of the parts IDs in the best shots are registered in association with the head 52, the face 53, the profile 54, the set of clothes 55, the bag 56, the pair of shoes 57, the hat 58, and the watch 59 as is the case with FIG. 4. The best shot camera table 213 differs from the best shot merge table 214 in that the best shot camera table 213 includes the best shot of the person trajectory within the camera, whereas the best shot merge table 214 merges the best shots of the same person using person trajectories from a plurality of cameras. In other words, updating the best shot camera table also updates the best shot merge table.

The merge table IDs in FIG. 4 include the same merge table ID 42 "200001" for the person trajectory IDs 41 "10001" and "10003," allowing the person trajectory IDs 41 "10001" and "10003" to be determined to indicate an identical person. As a result of entry of the identical person into an image capturing range of one camera at different times, this is managed as two person trajectories. The person trajectory IDs 41 "10001" and "10003" indicate the identical person, and the parts IDs in FIG. 5 are identical to the values of the parts IDs of the parts of the person trajectory ID "10001" in FIG. 4. Thus, the person trajectory ID 41 "10001" corresponds to the best shots for all the parts.

In contrast, the head 52, the face 53, and the profile 54 of the person ID 51 "200002" in FIG. 5 indicate the same parts IDs as those of the person trajectory "10002" in FIG. 4. Thus, for the head 52, the face 53, and the profile 54, the best shots are present at the time of the person trajectory "10002," and for the other parts such as the bag 56, the best shots are present on the person trajectories obtained by other cameras.

FIG. 6 illustrates an example of the parts DB 215. In association with a parts ID 61, the following are registered: a parts type 62, a feature value 63 such as vector data regarding a part, parts coordinates 64 identifying a position in a frame image where the part appears, a frame ID 65 identifying a frame in the video containing the part, and a score 66 for the part used to determine the best shot. Accordingly, a parts ID in the best shot camera table in FIG. 4 and in the best shot merge table in FIG. 5 allow the feature value 63 and the score 66 for the part and the like to be determined.

The parts DB 215 illustrated in FIG. 6 can be loaded into each frame of the moving image to compute the score for each part and store only the information corresponding to the highest score. For example, the parts ID "10318" indicates a feature value for the parts type 62 "face," the score "5," and the like. In this state, as the parts ID 61 "10003," an image of the parts type 62 "face" is newly input, and on the basis of the best shot definition table, the score is computed to be "3." Thus, the parts ID "10318" is determined to indicate the best shot. The best shot is an image expressing the part best, and in a case where, on the basis of the corresponding feature value, a comparison is made with the feature value of the part of another person trajectory, the identity of the person can be accurately determined.

In other words, for the person trajectory of the identical person from entry into the image capturing range of one camera until exit from the image capturing range, the best shot of each part is determined, and the feature value of the part in the best shot is stored. For the other cameras, for the person trajectory of the identical person from entry into the image capturing range of one camera until exit from the image capturing range, the best shot of each part is determined, and the feature value of the part in the best shot is compared between the cameras on a part-by-part basis, and similarity is computed. In a case where the sum of similarities of each part is equal to or larger than a given threshold value, the two person trajectories obtained by different cameras are determined to indicate the identical person (identity).

The parts DB in FIG. 6 is an example in which one table is provided for the identical person trajectory. However, for example, information such as person IDs in FIG. 5 which is used to identify persons can be added to allow a plurality of persons to be collectively managed in one table. Note that the feature value can include a well-known edge pattern feature value or a feature value using a generally known intermediate feature value of deep learning. The parts coordinates indicate a rectangle herein, but coordinates indicating a polygon, or the like, may be used. Parts images can be stored in association with the parts IDs to allow the best shot images to be checked later. Note that the parts DB may be created on a camera-by-camera basis or for merged parts of a plurality of cameras. Additionally, for prevention of an increase in the capacity of the parts DB, data other than the data regarding best shot parts may be deleted or data may be deleted after a given time elapses.

FIG. 7 is a diagram illustrating an example of best shot acquisition. FIG. 7 illustrates a person trajectory indicating that a person enters an image capturing range 71 of one camera at a point in time t=t0 and moves out of the frame at a point in time t=t3. In the illustrated example, the person holds a bag on the right side, and at the timing of a point in time t=t1, the best shot of the bag, in other words, a frame (also referred to as an image, in some cases) with the highest score for the bag, computed on the basis of the best shot definition table, is obtained. The feature value of the bag in this frame is stored along with the feature value 63 and the score 66 in the parts DB 215 in FIG. 6, and the parts ID 61 is stored for the bag 47 in the best shot camera table 213 in FIG. 4. The score for each part thus stored is compared with the scores for the best shots of the bag in the person trajectory obtained by the other cameras. As a result of the comparison, the feature value of the bag in the frame with the highest score is managed in the best shot merge table 214 in FIG. 6 via the parts ID, as the feature value of the bag of the person.

Additionally, at a point in time t=t2, the person is moving toward the camera, indicating that this frame corresponds to the best shot of the face (part) in the frame of this timing. For the best shot of the face, the score for the face in each frame is computed, and the score is compared between the frames to determine the best shot, as is the case with the bag and the other parts. Additionally, the feature value for the best shot of the face is stored in the parts DB in association with the parts ID, and the parts ID corresponds to the value of each part in the best shot camera table in FIG. 4 managed on a person-trajectory-by-person-trajectory basis and the best shot merge table in FIG. 5.

Figure 8:
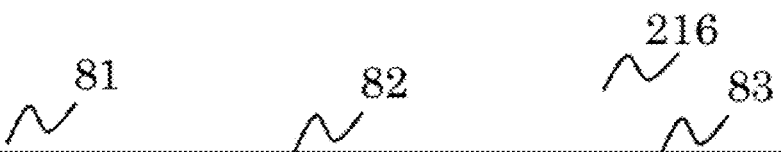
FIG. 8 is a diagram illustrating an example of a frame image DB 216.

FIG. 8 is a diagram illustrating an example of the frame image DB 216. As illustrated in FIG. 8 as an example, the following are registered: a frame ID 81 identifying each of frame images obtained by cutting images out from a video at intervals of designated times, a frame image file 82, and the date and time of image capturing 83. The frame image DB 216 may be created on a camera-by-camera basis or for a merged plurality of cameras. Additionally, in a case where the capacity of the image file needs to be reduced, instead of frame images, moving images may be saved on the basis of a moving image compression scheme such as H.264, and at the time of referencing, the frame images may be cut out from the moving image on the basis of time information.

With reference back to FIG. 2, functions implemented by the respective programs will be described.

The video acquisition program 217 acquires a video or an image from the camera 11 or the baggage appearance camera 13 and registers the video or the image in the frame image DB 216. Note that a method for receiving the video in real time or a method for receiving a temporarily accumulated video may be used.

The person tracking program 218 utilizes a well-known technique for using an optical flow or the like to calculate information regarding the difference between temporally consecutive frames from the video acquired from the video acquisition program 217, calculating, on a frame-by-frame basis, a set of adjacent pixels changing in the identical direction, and identifying, as a region of the identical person, a region continuously changing in the identical direction. The person tracking program 218 imparts an identical person ID to the identical person. Besides, any method may be used as long as the person tracking can be achieved, for example, a method for using a background difference method or the like to detect a person region and tracking, as the identical person, a person region in a preceding or succeeding frame in the video which is positionally close to the above-described person region. Additionally, as long as the person can be tracked, information from a 3D sensor such as a stereo camera may be used for person tracking.

Furthermore, the person tracking program 218 has a function for associating baggage with a person when the baggage is collected in an area where the baggage conveyed out from an X-ray inspection apparatus or the like is collected, an area such as a turntable from which the baggage checked at the airport is collected, or the like. The person and the baggage are associated with each other by detecting the timing of collection of the baggage and identifying a person being closest to the baggage at the timing. Any other method may be used as long as the baggage can be associated with the person. Implementing the association of the baggage with the person is effective for more clearly obtaining the best shot of the baggage.

Figure 9:
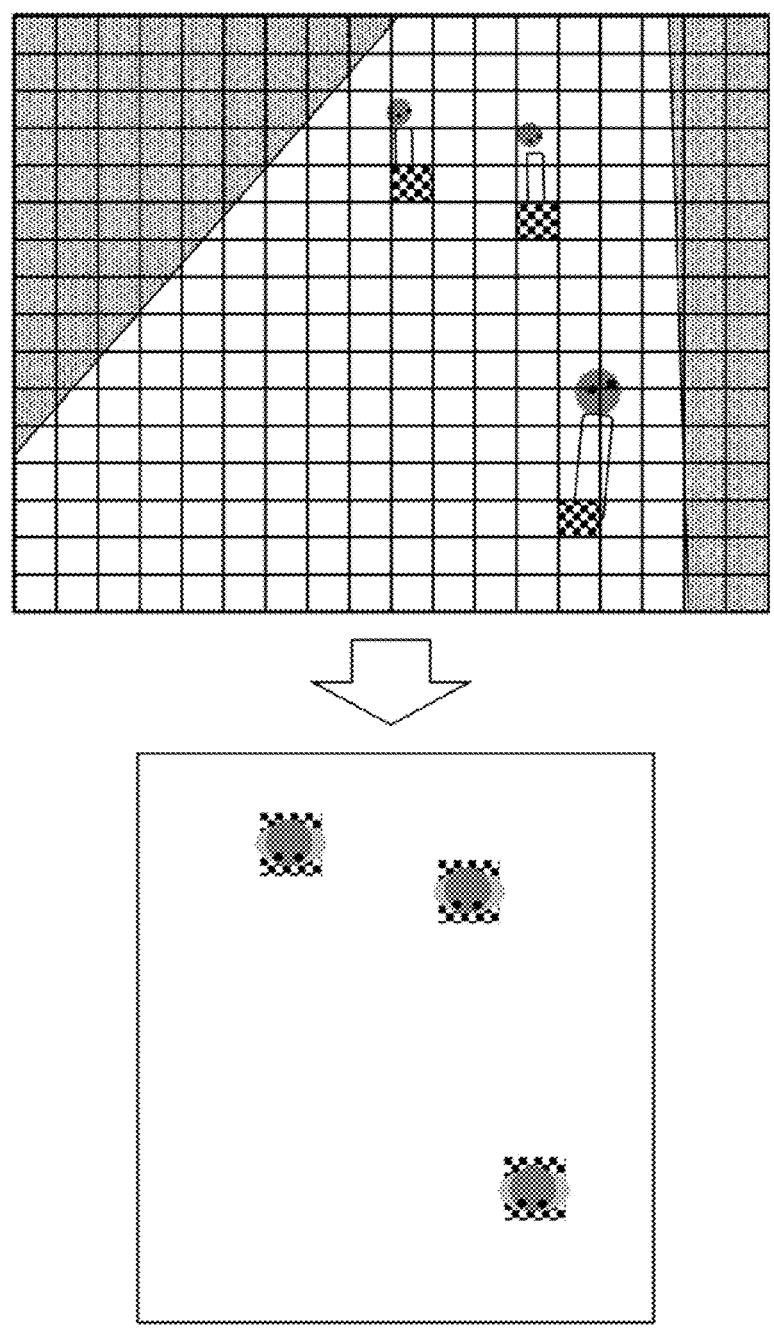
FIG. 9 is a diagram illustrating a method for identifying person positions on a two-dimensional plane in a video from a camera.

FIG. 9 is a diagram illustrating a method that is executed by the person position identification program 219 and in which person positions on a two-dimensional plane are identified on the basis of the person positions detected in the video from the camera.

The person position identification program 219 uses coordinates in the frame image and information related to positions on the two-dimensional plane, prepared on a camera-by-camera basis, to identify the person positions on the basis of the positions of feet of the persons. For example, as illustrated in an upper figure in FIG. 9, the camera video is divided into pieces on grids, and a correspondence relation is pre-registered that indicates which position in the lower diagram in FIG. 9 each of the grids corresponds. Thus, a position in the two-dimensional plane is identified on the basis of the position of the feet in a checkered pattern in the upper figure in FIG. 9. Note that any other technique may be used for identification as long as the position of the person can be identified in the camera video.

The parts region detection program 220 in FIG. 2 detects a parts region from information regarding the position of the person acquired from the frame image, and registers the parts region in the parts DB 215. For example, whether the person is moving in a forward direction, a backward direction, or a sideward direction can be estimated from the traveling direction of the person estimated on the basis of the person position, and cutting-out of an image can be performed using a template of parts illustrated in FIG. 10 as an example. Note that, for the presence of each part, a well-known similar-image retrieval technique is used for a cut-out image to compute similarity to an image of a general part, and high similarity allows the part to be determined to be present. For parts region detection using no template, the generally available library Fully Convolutional Instance-aware Semantic Segmentation can be used to learn the feature of each part and to detect the region of the part by segmentation of deep learning. In a case where a parts region is detected in the image using machine learning, a value indicative of reliability of detection is obtained together and can thus be used as a detection reliability used to determine the best shot part.

The best shot determination program 221 acquires the best shot of each part from among frame images (person trajectories) in which the identical person is tracked using a single camera, as described with reference to FIG. 7. The score for a part acquired from the frame image using the parts region detection program 220 is compared with the score for the same part acquired from another frame image for the identical person trajectory, and the frame with the higher score is determined to be the best shot. With the same score, the best shot is determined on the basis of the value of a predefined item, for example, the frame with the larger area is determined to be the best shot.

The camera table update program 222 performs updating at a timing when the person trajectory is interrupted (timing when one person trajectory is ended), for example, the person is displayed outside the angle of view of the camera. At this time, information such as the feature value of the person forming the person trajectory is acquired from the parts DB 215. The best shot determination program 221 stores the parts type 62, the feature value 63, the frame ID 65, and the score 66 for the best shot acquired from within the person trajectory in the parts DB 215 in association with the parts ID 61, and the parts ID is registered in the best shot camera table for the corresponding part. When the registration is completed, the person retrieval program is used to determine whether any latest person trajectory depicting the same person is present, and in a case where the same, latest person trajectory is present, the person trajectory is merged, and best shot parts with higher scores are employed on a part-by-part basis.

Note that, whether different person trajectories indicate the identical person (identity of the person) is determined by comparing the feature values of each part for similarity. In other words, the best shot of each part is determined, and the feature value of the part in the best shot is used for comparison on a p art-by-p art basis, and similarity is computed. In a case where the sum of similarities of the parts is equal to or larger than a given threshold, the two person trajectories obtained by different cameras are determined to indicate the identical person (identity of the person).

The merge table update program 223 compares the scores (based on the best shot definition table) for each part in one person trajectory registered in the best shot camera table 213, and determines the higher score to correspond to the best shot of each part. In other words, the merge table update program 223 registers parts IDs corresponding to high scores as parts IDs read for the parts such as the head 43 and the face 43 in the best shot camera table 213 in FIG. 4. The parts IDs registered in the best shot camera table 213 are referred to as best short parts.

The person retrieval program 224 acquires a person ID in the best shot merge table 214 which corresponds to the registered person trajectory. Furthermore, the best shot determination program 221 compares the newly registered best shot part with the best shot part registered in the best shot merge table 214, and in a case where the newly registered best shot part has a higher score, updates the ID of the best shot part registered in the best shot merge table 214.

Specifically, the score 66 computed on the basis of the best shot definition table 212 in association with the best shot part (parts ID) is registered in the parts DB 215, and the score stored in association with the newly registered best shot part is compared with the score stored in association with the best shot part registered in the best shot merge table 214 to determine the best shot. Note that it is assumed that the best shot part to be compared is the person trajectory indicating the identical person. Determination of the identity of the person is based on the similarity between the feature values of each part.

The person retrieval program 224 uses the feature values registered in the parts DB 215 to perform comparison of the appearance of the best shot part (best shot of each part) between the person trajectories for similarity, and acquires, as the person trajectory of the same person, the person trajectory for which the sum of the similarities of the parts is equal to or larger than the threshold. The computation of the similarity is performed on a best-shot-part-by-best-shot-part basis, and in a case where the sum of the similarity between the heads, the similarity between the faces, the similarity between the profiles, the similarity between the set of clothes, the similarity between the bags, the similarity between the pair of shoes, the similarity between the hats, and the similarity between the watches is equal to or larger than the threshold, the identity of the person is determined. Here, in a case where the part to be compared is not present, for example, no watch is present, that item is excluded from the computation. Additionally, the degree of particular contribution of the person varies with the part and may thus be obtained by multiplying each item by a predefined weight when the sum of the similarities is obtained. The computation of similarity of each part can use the similar-image retrieval technique or the like. However, any other method may be used as long as the method allows the similarity to be computed. Note that, instead of the sum of the similarities, the average value of the similarities may be used, and in that case, the sum of the similarities may be divided by the number of the parts.

Figure 11:
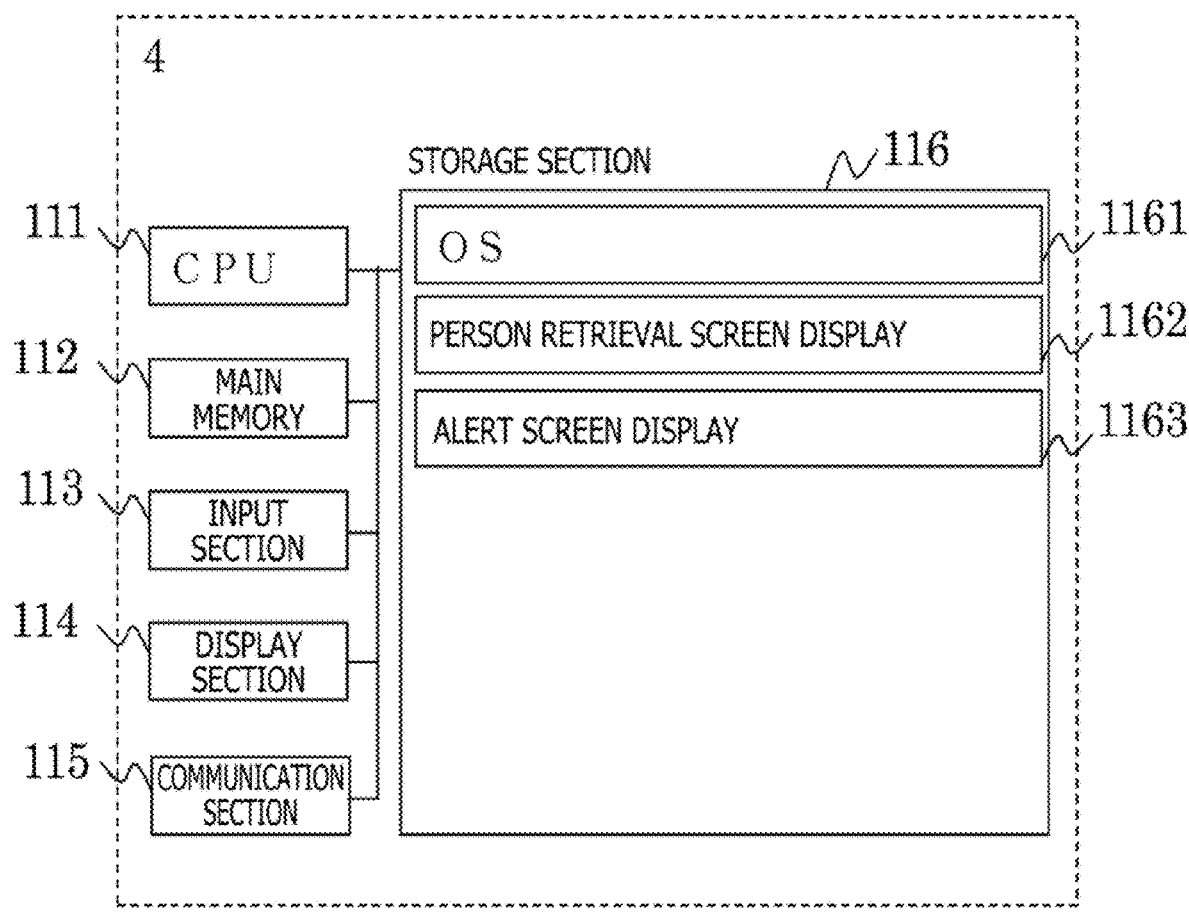
FIG. 11 is a diagram illustrating an example of a configuration diagram of a workstation PC 4.

FIG. 11 is a diagram illustrating an example of a configuration diagram of the workstation PC 4. The workstation PC 4, which designates the person to be retrieved and tracks the owner of a piece of inspection-needed baggage to alert-display the piece of baggage, includes a computer including a CPU 111, a main memory 112, an input section 113, a display section 114, a communication section 115, and a storage section 116, as illustrated in FIG. 11 as an example. The storage section 116 stores an OS 1161, a person retrieval screen display program 1162, and an alert screen display program 1163. These various programs are read into the main memory 112 and executed by the CPU 111 to implement various functions.

The person retrieval screen display program 1162 displays the video from the camera 11 in real time, or when a condition such as a date and time requested by a user or a camera installation position is input from the input section 113, displays, among the videos accumulated in the frame image DB 216 of the video analysis PC 3, a video requested by the user according to the input. Additionally, in a case where the user finds a person to be checked, the person retrieval screen display program 1162 receives a designation of a region from the input section 113 such as a mouse, uses the best shot parts of the person for which the designation of the region has been received to perform retrieval in accordance with the person retrieval program 224 of the video analysis PC 3, and retrieves and displays the video of the identical person from the other cameras or displays the moving trajectory of the person on a map.

In a case where a check-needed person is detected, for example, baggage is detected by the X-ray inspection apparatus, the alert screen display program 1163 displays the person with the person ID indicating the person region at the identified position, along with the results of tracking by the other cameras 11, and causes the latest information used to check where the person is, to be displayed on a screen of the display section 114 such as the display of the workstation PC 4.

<Acquisition of Best Shot Parts>

Figure 12:
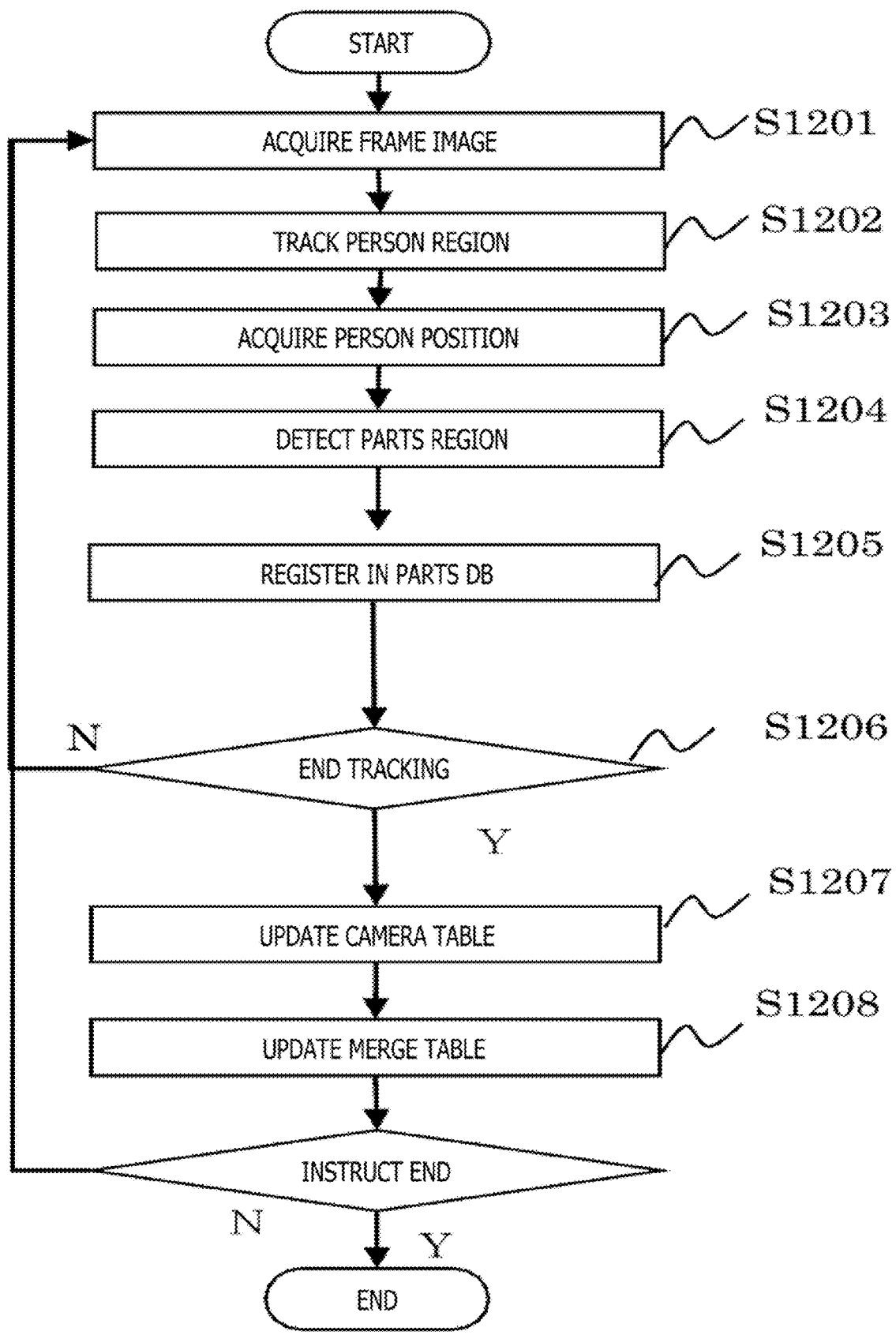
FIG. 12 is a flowchart illustrating an example of acquisition of best shot parts.

FIG. 12 is a flowchart illustrating an example of acquisition of the best shot parts for each of the person trajectories of the same person from the video data acquired from the camera 11.

First, the video acquisition program 217 acquires a video from the camera 11, acquires frame images from the video, and stores the frame images in the frame image DB 216 (S1201). Here, in a case where the video is compressed by MotionJpeg or MPEG encode, the video is divided into frame images in such a way as to allow for image processing.

Then, the person tracking program 218 reads the video data from the camera 11 or the frame image DB 216, detects, in each frame image, the region where a person is present, and uses a scheme such as an optical flow to acquire the region and the moving trajectory of the person (S1202). Note that, in a case where a plurality of persons appears in the same frame image, the person trajectory ID is saved in the best shot camera table 213 on a person-by-person basis.

Then, the person position identification program 219 acquires, by the method described with reference to FIG. 9, a person position on the two-dimensional plane from the person region information acquired in step S1202 (S1203). Identification of the person position on the two-dimensional plane determines the moving direction of the person, and this is effective for facilitating acquisition of best shot parts to which the direction the person faces is related.

Figure 10:
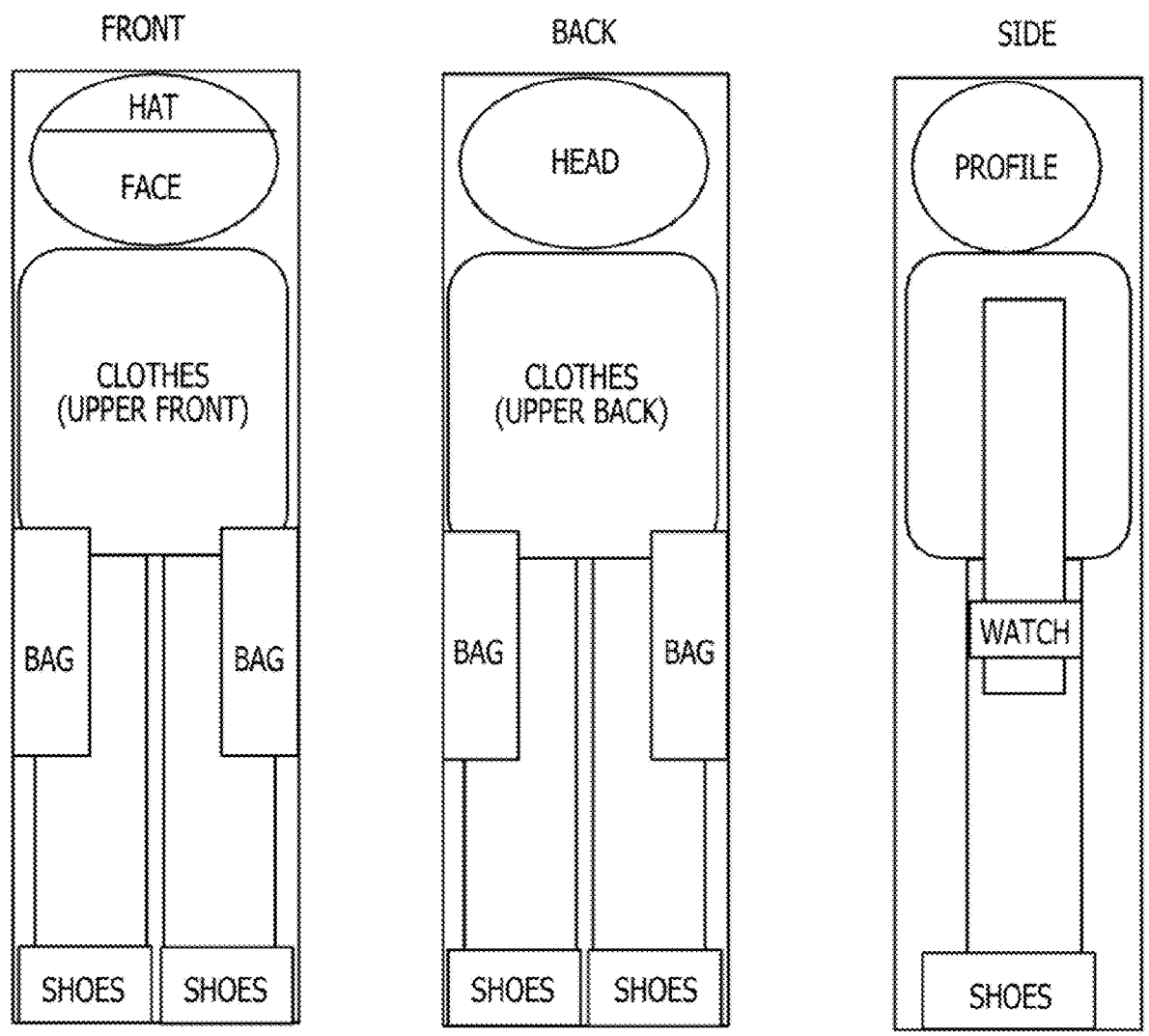
FIG. 10 is a diagram illustrating a template of parts.

Then, the parts region detection program 220 detects the parts regions and the parts types corresponding to the head, the face, the profile, the set of clothes, the bag, the pair of shoes, the hat, and the watch (S1204). In a case where the parts region is not detected, the image is determined not to contain the part and not to contain the detection target. Note that, in this step, the template of the parts in FIG. 10 is used to detect the region of each part. Each parts region can be detected by using segmentation processing of deep learning.

The video analysis PC 2 continues steps S1201 to S1204 described above until the person trajectory is interrupted, and stores the acquired data in a buffer or the parts DB 215 (S1205). In other words, the data is stored in the parts DB 215 after a person enters the image capturing range of one camera and before the person exits the image capturing range. Note that, in a case where a plurality of persons appears in the frame of the same camera, the above-described processing is executed on a person-by-person basis. Here, for facilitation of understanding, the case of one person trajectory will be described.

The best shot determination program 221 creates entries in the parts DB 215 and registers information in the parts DB 215 (S1205). In this step, when the best shot determination program 221 receives the parts region and the parts type from the parts region detection program 220, the best shot determination program 221 imparts the parts ID to the parts region and the parts type and stores the parts region and the parts type with the parts ID, in the parts DB 215 for the parts type 62. Additionally, when the parts ID is imparted to the parts region, the best shot determination program 221 receives the parts coordinates from the person position identification program 219 and stores the parts coordinates 64 for the corresponding parts ID. Furthermore, the best shot determination program 221 computes the feature value 63 for each part, and stores the feature value 63 in the parts DB 215.

Additionally, the best shot determination program 221 computes the score for each part on the basis of the best shot definition table 212, and stores the score in the parts DB 215. Thus, the best shot determination program 221 acquires, for one person trajectory, information included in the parts DB 215, such as the parts ID 61, the parts type 62, and the feature value 63 on a video-frame-by-video-frame basis, and stores the information in the parts DB 215.

Note that the best shot determination program 221 stores the feature value 63 and the score 66 for each part in the parts DB 215 on a video-frame-by-video-frame basis and that, for the same parts type, with entries with lower scores deleted and with only entries with higher scores left, the information regarding the best shots of the parts can be constantly stored in the parts DB 215, enabling a reduction in the capacity of the parts DB 215.

Then, when the person trajectory is interrupted (S1206), the camera table update program 222 registers, in the best shot camera table 213, the value of the parts ID 61 registered in the parts DB 215 (S1207). Note that, within the same camera, the same person may disappear from the video and then appear again in the same camera and thus that, in a case where the person trajectories are periodically checked against one another and any person trajectories are found to indicate the same person, those person trajectories are merged. The determination of the identical person is based on the similarity between the feature values of each part as described above.

Note that, for the person trajectories of the identical person, the scores for each part are compared with each other, and the higher score is determined to indicate the best shot part of the part.

Then, the merge table update program 223 receives an update event of the best shot camera table 213, and in a case where the best shot camera table 213 is updated, compares the score for the new best shot part registered in the best shot camera table with the score for a past best shot part registered in the best shot merge table 214. In a case where the score for the new part is higher, the merge table update program 223 performs updating to the best shot part (value of the parts ID) registered in the best shot merge table 214 (S1208).

Then, in a case where input of the video is completed, the processing is ended. The processing from step S1201 to step S1207 described above is executed on the videos from all the camera 11 to allow best shot parts acquired from different times to be acquired on a person-trajectory-by-person-trajectory basis, that is, on a person-trajectory-ID-by-person-trajectory-ID basis. This is effective for enabling maximum acquisition of the feature values indicating the features of the appearance of the person.

Note that the processing from step S1203 to step S1208 described above is executed on a person-trajectory-by-person-trajectory basis and asynchronously on a person-trajectory-by-person-trajectory basis to prevent the acquisition, during acquisition of best shot parts of a first person, of best shot parts of another person.

<Person Retrieval>

Figure 13:
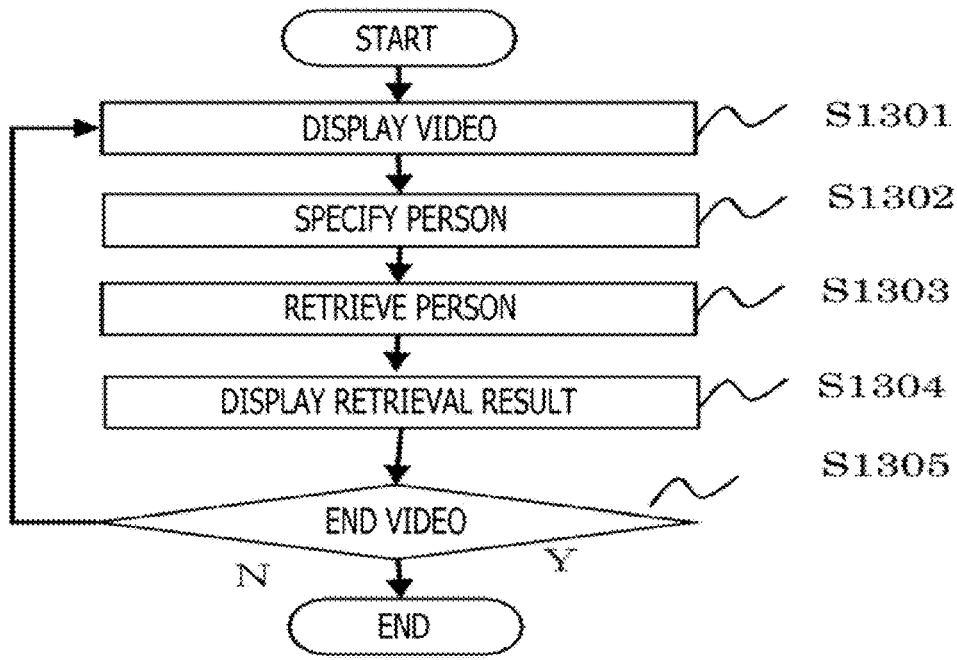
FIG. 13 is a diagram illustrating an example of processing for retrieving a video of a designated person.

FIG. 13 illustrates an example of video retrieval processing for a designated person for a video displayed on the workstation PC 4.

First, the person retrieval screen display program 1162 displays, on the display section 114 such as the display, the real-time videos from the cameras 11 or the video saved in the frame image DB 216 of the video analysis PC 3 (S1301). Here, the real-time videos may be displayed by arranging videos from designated cameras 11 on the screen or switching among the cameras 11 in a predetermined order for display, and it is sufficient that the videos from the cameras 11 can be checked. Additionally, for the display of the accumulated videos, videos are displayed that are acquired by receiving designated times and camera IDs from the user and making a request for acquisition of video data to the video analysis PC 3.

Then, the person retrieval screen display program 1162 receives, via the input section 114 such as a keyboard or a mouse, a designation of a person to be retrieved, and acquires information enabling identification of the person to be searched for, such as camera IDs, frame image IDs, dates and times, and designated coordinates (S1302). For example, an arrow portion indicates the position of a mouse cursor, and the person at the position where the mouse is clicked is identified as a person to be retrieved. Note that, in the displayed image, a rectangle or the like indicating a person region may be superimposed on a person region portion detected by the video analysis PC.

Then, the person retrieval program 224 performs person retrieval by using the information acquired in step S1302 described above and enabling identification of the person to be searched for, to acquire information regarding the best shot parts of the designated person from the best shot merge table 214, comparing the feature values of the best shot parts to calculate the similarity between the person trajectories, and identifying the person trajectory with high similarity as the identical person (S1303). In a case where the person trajectory corresponding to the selected frame image is already registered in the best shot merge table 214, a retrieval result for the identical person can be acquired simply by acquiring the corresponding person trajectory ID. In a case where a newly uploaded video is retrieved as a query, the best shot parts are detected in the video, and the person retrieval program 224 uses the information regarding the parts to identify the person trajectory of the identical person from the best shot merge table, as is the case with the contents of the processing for the best shot parts. Note that, in a case where a person is designated in an image not containing a plurality of frame images, parts detected in the image for which a person is designated are directly used as best shot parts.

Then, the person retrieval screen display program 1162 displays, on a display apparatus such as a display, the retrieval result acquired in step S1303 for the person retrieval (S1304). As long as the action history of the person can be checked, any display method for display of the retrieval result may be used, for example, videos from the cameras containing person trajectories corresponding to retrieval results may be arranged for display, the moving trajectory of the person may be displayed on the two-dimensional map, or the best shot parts may be arranged on a trajectory-by-trajectory basis for display.

Then, the video to be displayed is ended, the processing is ended (S1305).

<Person Alert>

Figure 14:
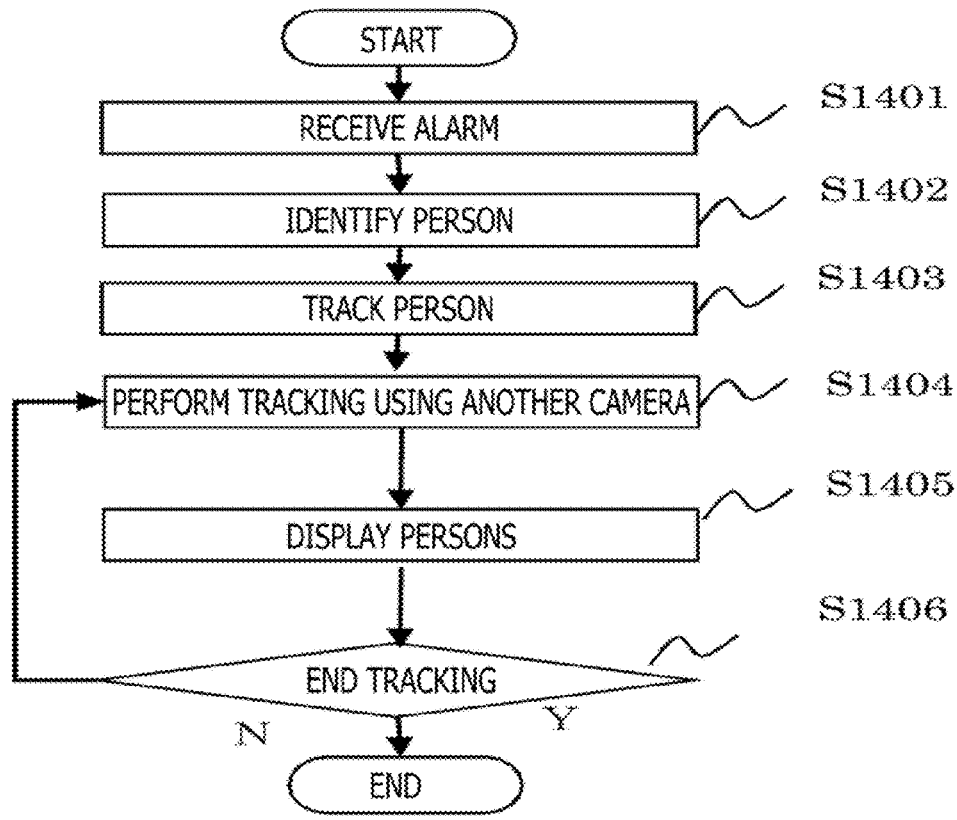
FIG. 14 is a flowchart illustrating an example of processing for displaying latest information regarding an alert target person.

FIG. 14 is a flowchart illustrating an example of processing for displaying the latest information regarding an alert target person received by the workstation PC 4.

First, the alert screen display program 1163 receives an alert signal in a baggage inspection executed by the X-ray inspection apparatus 12 and receives information including alert contents, along with a baggage appearance video captured by the baggage appearance camera 13 (S1401).

Then, based on information regarding a position such as a baggage claim area of the inspection apparatus where a piece of predefined baggage merges with the person and information such as the speed of a belt conveyor of the X-ray inspection apparatus 12, the person tracking program 218 identifies and acquires a person region including the person corresponding to the owner of the bag and the baggage at the time of collection of the above-described baggage (S1402).

Then, the alert screen display program 1163 tracks the above-described person and acquires the best shot parts in the person trajectory as is the case with the procedure of acquisition of the best shot parts (S1403).

Then, in a case where the tracking of the alert target person within the identical camera is completed, the person retrieval program 224 compares the feature values of the best shot parts to calculate whether any alert target person is present within the other cameras, as is the case with the procedure of the person retrieval, identifies, as an alert target, a person with a trajectory including many similar best shot parts or having high similarity, and the person is tracked using other cameras (S1404). The alert screen display program 1163 causes the display apparatus to display live videos from the cameras 11 including the latest video containing the identified person (S1405).

Then, in a case where none of the cameras 11 include the trajectory of the alert target person for a given period of time, the tracking is determined to be completed and is ended (S1406).

As described above, the person retrieval can be achieved with high accuracy on the basis of the information regarding a plurality of parts of the person in images captured by the camera 11. Furthermore, the person can be retrieved, searched for, or tracked on the basis of the feature values of the parts in the frame of the video representing the features of the parts best.

Additionally, the person tracking among different cameras can be accurately performed.

In addition, the information regarding the best shot parts is stored to allow retrieval between the parts to be performed when the bag or clothes are designated for retrieval.

REFERENCE SIGNS LIST

1: Input device
2: Network
3: Video analysis PC
4: Workstation PC
11: Camera
12: X-ray baggage inspection apparatus
13: Baggage appearance camera
201: CPU
202: Main memory
203: Input section
204: Display section
205: Communication section
210: Storage section 212: Best shot definition table
213: Best shot camera table
214: Best shot merge table
215: Parts DB
220: Parts region detection program
221: Best shot determination program
222: Camera table update program
223: Merge table update program
1162: Person retrieval screen display program
1163: Alert screen display program

The invention claimed is:

1. A video analysis apparatus connected to an image capturing apparatus including a plurality of cameras, wherein the video analysis apparatus,
for a plurality of persons in images captured by the cameras
tracks at least one of the plurality of persons,
detects a plurality of parts of the tracked person,
for the plurality of parts detected, on a basis of information defining scores used to determine a best shot of each of the parts, computes a score for each part for each of frames of videos from the cameras,
compares, for each of the parts, the scores for each part computed for each of the frames to determine a best shot of each of the parts,
stores, for each of the parts, a feature value in association with each part, and
compares the feature values of each of the parts of the plurality of persons to determine identity of the tracked person;
wherein on a basis of an alert signal and a baggage video from a baggage inspection apparatus, the video analysis apparatus identifies a region including an owner of baggage, tracks a person trajectory of the owner, acquires a best shot of each of the parts of the tracked person trajectory, compares the feature value of the acquired best shot of each of the parts with the feature value of each of the parts in the best shot stored in a corresponding parts DB of a best shot merge table stored in the storage section, and retrieves a person identical to the owner of the baggage.

2. The video analysis apparatus according to claim 1, wherein the video analysis apparatus detects at least two types of a head, a face, a set of clothes, a bag, a pair of shoes, a hat, and a watch of each of the persons as the plurality of parts.

3. The video analysis apparatus according to claim 1, wherein the video analysis apparatus selects, for each of the plurality of parts, items of an area, a frontal degree, a geometric feature, a luminance value, and a detection reliability, and uses an item score defined for each of the selected items to compute a score for each of the parts.

4. The video analysis apparatus according to claim 1, wherein
the video analysis apparatus includes a storage section,
the storage section stores a parts DB in which each of the parts is associated with a feature value of each part, and
the parts DB stores, for one of the plurality of parts, a parts type representing a type of the part, the feature value of the part, and the score for the part in association with a parts ID of the part.

5. The video analysis apparatus according to claim 4, wherein
the storage section, for one person trajectory of the person in an image captured by one of the plurality of cameras, stores a best shot camera table in which a person trajectory ID corresponding to the person trajectory is associated with the parts IDs of a plurality of parts in the person trajectory.

6. The video analysis apparatus according to claim 5, wherein
the storage section stores a best shot merge table managing, for each part, the parts ID with a high score in a case where person trajectories of the plurality of persons in images captured by the plurality of cameras indicate an identical person.

7. A person retrieval system comprising:
an image capturing apparatus including a plurality of cameras; and
a video analysis apparatus, wherein
the video analysis apparatus,
for a plurality of persons in images captured by the cameras,
tracks at least one of the plurality of persons,
detects a plurality of parts of the tracked person,
for the plurality of parts detected, on a basis of information defining scores used to determine a best shot of each of the parts, computes a score for the part for each of frames of videos from the cameras,
compares, for each of the parts, the scores for each part computed for each of the frames to determine a best shot of each of the parts,
stores, for each of the parts, a feature value in association with each part in a storage section, and
compares the feature values of each of the parts of the plurality of persons to determine identity of the tracked person;
wherein on a basis of an alert signal and a baggage video from a baggage inspection apparatus, the video analysis apparatus identifies a region including an owner of baggage, tracks a person trajectory of the owner, acquires a best shot of each of the parts of the tracked person trajectory, compares the feature value of the acquired best shot of each of the parts with the feature value of each of the parts in the best shot stored in a corresponding parts DB of a best shot merge table stored in the storage section, and retrieves a person identical to the owner of the baggage.

8. The person retrieval system according to claim 7, comprising: a workstation connected to the video analysis apparatus, wherein the workstation includes
a display section displaying a video captured by the image capturing apparatus, and
an input section receiving input information used to identify a person in the video displayed on the display section, and
the video analysis apparatus computes feature values of a plurality of parts of the person identified by the input section of the workstation, and retrieves the person identified by the input section on a basis of a best shot merge table stored in the storage section and allowing the feature value of each of the parts to be referenced.

9. A person retrieval method of performing analysis using a video analysis apparatus connected to an image capturing apparatus including a plurality of cameras, wherein
the video analysis apparatus, for a plurality of persons in images captured by the cameras,
tracks at least one of the plurality of persons,
detects parts of the tracked person,
for the plurality of parts-detected, on a basis of information defining scores used to determine a best shot of each of the parts, computes a score for the part for each of frames of videos from the cameras, compares, for each of the parts, the scores for each part to determine a best shot of each of the parts, stores, for each of the parts, a feature value in association with each part in a storage section, and compares the feature values of each of the parts of the plurality of persons to determine identity of the tracked person; and wherein on a basis of an alert signal and a baggage video from a baggage inspection apparatus, the video analysis apparatus identifies a region including an owner of baggage, tracks a person trajectory of the owner, acquires a best shot of each of the parts of the tracked person trajectory, compares the feature value of the acquired best shot of each of the parts with the feature value of each of the parts in the best shot stored in a corresponding parts DB of a best shot merge table stored in the storage section, and retrieves a person identical to the owner of the baggage.

10. The person retrieval method according to claim 9, wherein the video analysis apparatus selects, for each of the plurality of parts, items of an area, a frontal degree, a geometric feature, a luminance value, and a detection reliability, and uses an item score defined for each of the selected items to compute a score for each of the parts.

11. The person retrieval method according to claim 10, wherein the video analysis apparatus, for one of the plurality of parts, causes a parts type representing a type of the part, a feature value of the part, and the score for the part to be stored in the storage section in association with a parts ID of the part.

12. The person retrieval method according to claim 11, wherein the video analysis apparatus, in a case where person trajectories of a plurality of persons in images captured by the plurality of cameras indicate an identical person, selects, for each part, the parts ID with a high score, and manages a best shot merge table collectively including best shots of the parts of the identical person.

13. The person retrieval method according to claim 9, wherein the video analysis apparatus displays a video captured by the image capturing apparatus, and when information used to identify the person in the displayed video is input to the video analysis apparatus, computes feature values of a plurality of parts of the identified person, and retrieves the identified person on a basis of a best shot merge table stored in the storage section and allowing the feature value of each of the parts to be referenced.

* * * * *